United States Patent [19]

Foran

[11] Patent Number: 5,554,252
[45] Date of Patent: Sep. 10, 1996

[54] HOT AND COOL AIR BONDING APPARATUS

[75] Inventor: Hugh C. Foran, Utica, Mich.

[73] Assignee: The Budd Company, Troy, Mich.

[21] Appl. No.: 379,873

[22] Filed: Jan. 27, 1995

[51] Int. Cl.⁶ .............................. B32B 31/04; B32B 31/20
[52] U.S. Cl. .......................... 156/497; 156/498; 156/82; 156/311
[58] Field of Search ..................... 156/82, 307.3, 156/311, 359, 497, 498, 383, 384; 428/507, 508, 509, 311, 497, 498

[56] References Cited

U.S. PATENT DOCUMENTS

| | | |
|---|---|---|
| 2,610,288 | 9/1952 | Cage . |
| 2,774,700 | 12/1956 | Killington . |
| 2,820,875 | 1/1958 | Werych et al. . |
| 3,437,776 | 4/1969 | Schaeffer et al. . |
| 3,454,442 | 7/1969 | Heller, Jr. . |
| 3,669,821 | 6/1972 | Sharp . |
| 3,888,715 | 6/1975 | Fraser et al. . |
| 4,383,060 | 5/1983 | Dearlove et al. . |
| 4,423,191 | 12/1983 | Haven et al. . |
| 4,568,405 | 2/1986 | Lin . |
| 4,941,936 | 7/1990 | Wilkinson et al. . |
| 4,941,937 | 7/1990 | Iseler et al. . |
| 5,254,197 | 10/1993 | Klems ................................. 156/381 X |

FOREIGN PATENT DOCUMENTS 8707557  12/1987  WIPO ................................. 156/381

OTHER PUBLICATIONS

RP/C Alliance Corporation, "Supplying Equipment for the Reinforced Plastic/Composite Industry", 6 pages, undated.

*Primary Examiner*—Michael W. Ball
*Assistant Examiner*—Sam Chuan Yao
*Attorney, Agent, or Firm*—Harness, Dickey & Pierce, P.L.C.

[57] ABSTRACT

An apparatus and method is disclosed for bonding a fiber reinforced plastic automotive body member to a reinforcement member. An adhesive is located between mating surfaces of the body member and the reinforcement member. Pressurized heated and cool air is used to heat and facilitate the cooling of the adhesive. The apparatus includes a switchable heating and cooling system that first provides pressurized heated air about outer surfaces of the body member and the reinforcement member, and thereafter, the system provides pressurized cool air about the same outer surfaces.

26 Claims, 4 Drawing Sheets

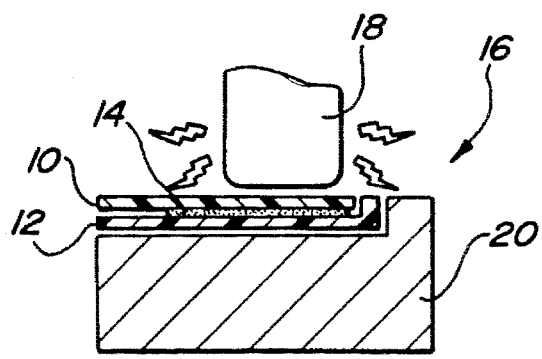
*Fig-1*
PRIOR ART
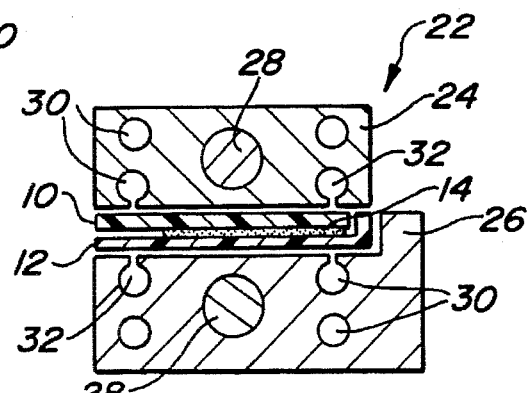
*Fig-2*
PRIOR ART
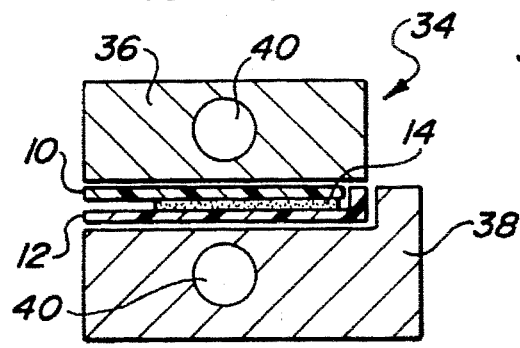
*Fig-3*
PRIOR ART
*Fig-4*

HOT AND COOL AIR BONDING APPARATUS

BACKGROUND OF THE INVENTION

1. Technical Field

This invention relates to bonding apparatuses and techniques and, more particularly, to an apparatus and method for bonding automotive fiber reinforced plastic (FRP) members together.

2. Discussion of the Related Art

Various techniques are currently employed for bonding fiber reinforced plastic (FRP) members together for use in automotive body applications such as, but not limited to, hoods, doors, bumpers, and the like. There has been an outgrowth in the number of apparatuses and methods available for producing bonded FRP assemblies due to the growing trend in the automotive industry to replace heavier metal components with plastic assemblies. These assemblies are typically bonded by heating an adhesive placed between the mating surfaces of two FRP members to a temperature exceeding its curing temperature.

FIGS. 1-3 illustrate in simplified manners, examples of well known bonding techniques that use heat to bond an FRP assembly consisting of FRP members 10 and 12 with adhesive 14 placed therebetween. FIG. 1 illustrates dielectric heating apparatus 16 that produces radio frequency electrostatic fields between electrode 18 and block member 20. The electrostatic fields quickly heat adhesive 14 to a temperature above its curing temperature to thereby bond FRP members 10 and 12. Commonly assigned U.S. Pat. No. 4,941,936 to Wilkinson et al. and U.S. Pat. No. 4,941,937 to Iseler et al. disclose examples of dielectric heating techniques which are hereby incorporated herein by reference. Dielectric heating techniques have the advantage of reducing cycle times along with the accompanying disadvantage of heating an FRP assembly in a manner that is difficult to control and maintain.

FIG. 2 illustrates bonding apparatus 22 that utilizes cartridge heaters 28 for heating metal block members 24 and 26. Block members 24 and 26 in turn heat the air flowing through air circuits 30, a portion of which, flows through openings 32 for heating adhesive 14 between FRP members 10 and 12. One disadvantage with this type of bonding technique is that it requires a large supply of compressed air to operate efficiently.

FIG. 3 illustrates bonding apparatus 34 that utilizes heated steam and/or hot water flowing through passages 40 for heating metal block members 36 and 38. Block members 36 and 38 in turn heat adhesive 14 between FRP members 10 and 12. This bonding technique has the disadvantage of requiring a high cycle time when compared to the bonding techniques illustrated in FIGS. 1 and 2.

When bonded FRP assemblies are used in exterior automotive body applications, it is of the utmost importance that the bonding technique employed does not adversely effect the surface qualities of the exterior FRP members and that the technique provides even bonding not withstanding the size of the FRP members.

Thus, it would be desirable to produce a bonding apparatus that improves the surface qualities of a resulting FRP assembly and that provides uniform bonding strength throughout the assembly. Further, it would be desirable to provide a bonding technique that expeditiously adheres a first FRP member to a reinforcement FRP member without affecting surface qualities or bonding strength characteristics.

SUMMARY OF THE INVENTION

Pursuant to the present invention, a bonding apparatus and method for expeditiously bonding automotive fiber reinforced plastic (FRP) members is disclosed. The apparatus provides the resulting bonded assembly with uniform bonding characteristics and improved surface qualities. While the present invention will be described in connection with the bonding of FRP members, it will be understood that other plastic materials or even metal may be used.

In accordance with the teachings of one embodiment of this invention, an apparatus is provided for bonding a first member, typically an automotive outer skin member, to a reinforcement member. An uncured adhesive is located on the mating surface of the first member. First and second nest members are provided for receiving and supporting the first member and the reinforcement member in a spaced relationship. Relative movement of the nest members is controlled such that the mating surface of the first member engages a corresponding mating surface of the reinforcement member with the adhesive therebetween. Switchable heating and cooling assemblies first provide pressurized heated air to the nest members that in turn channel the heated air about portions of the outer surfaces of the first member and the reinforcement member. Thereafter, the switchable heating and cooling assemblies provide cool air to the nest members which in turn channel the cool air about the same portions of the outer surfaces of the first member and the reinforcement member. The pressurized heated air heats the adhesive to a temperature exceeding its curing temperature, and the pressurized cool air facilitates the cooling process for the resulting assembly.

In the preferred embodiment, after the pressurized heated air has been provided to the nest members, a bypass chilling system provides pressurized chilled air to the nest members which in turn channel the chilled air about portions of the outer surfaces of the first member and the reinforcement member, thereby decreasing the time required for the resulting assembly to cool.

BRIEF DESCRIPTION OF THE DRAWINGS

The various advantages of the present invention will become apparent to those skilled in the art after reading the following specifications and by reference to the drawings in which:

FIG. 1 is a simplified illustration of a prior art bonding apparatus;

FIG. 2 is a simplified illustration of a second prior art bonding apparatus;

FIG. 3 is a simplified illustration of a third prior art bonding apparatus;

FIG. 4 is an exploded perspective view of an assembly comprising an exterior automotive body member and a reinforcement member therefor;

DETAILED DESCRIPTION OF THE PREFERRED EMBODIMENT

Figure 5:
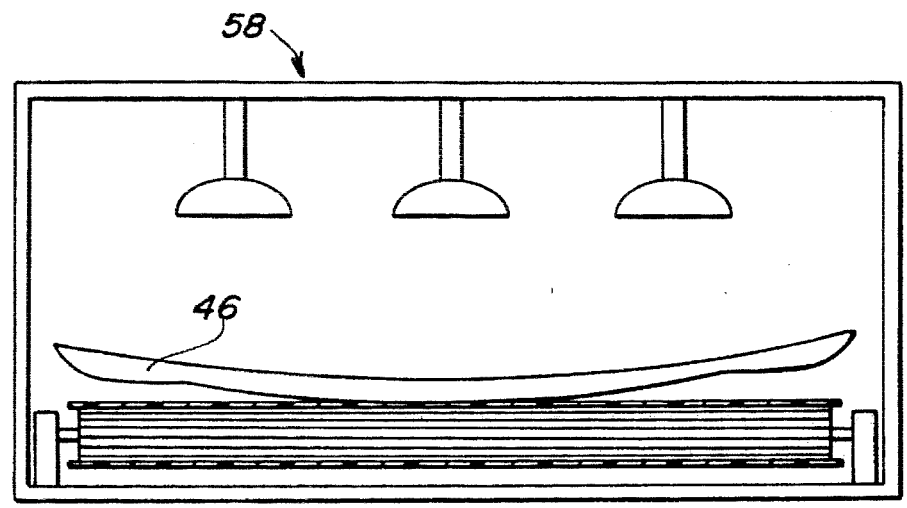
FIG. 5 is a simplified illustration of a quartz heating apparatus.

The following description of the preferred embodiments is merely exemplary in nature and is in no way intended to limit the invention or its application or uses.

The present invention is particularly concerned with bonding reinforced exterior automotive body assemblies such as, but not limited to, hoods, doors, and bumper assemblies. The invention provides an apparatus and expeditious method for bonding a first, typically exterior, fiber reinforced plastic (FRP) member to a second reinforcement member, which is also preferably manufactured of a FRP material although other plastic materials or even metal may be used.

The invention is described in detail below with reference to the manufacture of an automotive hood assembly, however, it will be appreciated by those skilled in the art that the present invention, as defined by the appended claims, is clearly not limited to this particular application. Furthermore, the invention is described with reference to the hood assembly members being formed from FRP materials, however, it will be appreciated by those skilled in the art that the use of other plastic materials or metals is within the scope of the present invention. Hood assembly 42 is illustrated in the drawings and consists of a relatively thin (about 0.080 to 0.120 inch thick) outer skin member 44 and reinforcement member 46. Outer skin member 44 and reinforcement member 46 are constructed of FRP material and are preferably made from thermosetting sheet molding compound (SMC) material which has been compression molded under vacuum. U.S. Pat. Nos. 4,488,862; 4,551,085; and 4,612,149 owned by the Budd Company of Troy, Mich., relate to such techniques and are hereby incorporated herein by reference. Outer skin member 44 includes outer surface 48 and inner mating surface 50. Similarly, reinforcement member 46 includes outer surface 52 and inner mating surface 54.

In order to bond outer skin member 44 to reinforcement member 46, a bead of adhesive 56 is laid on a mating portion of inner mating surface 50. The adhesive 56 is a thermosetting resin that exhibits a change in dielectric properties when cured. The adhesive 56 preferably contains a resin consisting of uncrossedlinked polymers and monomers, with a second part consisting of a hardener or catalyst. Epoxy resin adhesives are presently preferred, although polyurethanes should prove to be acceptable. These adhesives are to be distinguished from glues such as animal glues which do not rely upon a chemical change to effect their adhesive qualities. As will appear clear from the following discussion, the present invention utilizes this characteristic of certain adhesives to great advantage. By way of a specific, but nonlimiting example, adhesive 56 is a Lord 380\382 epoxy adhesive available from Lord Corporation.

As shown in a simplified manner in FIG. 5, reinforcement member 46 is preferably preheated in quartz heating apparatus 58 or any other suitable type of heating unit prior to being bonded with outer skin member 44.

Figure 8:
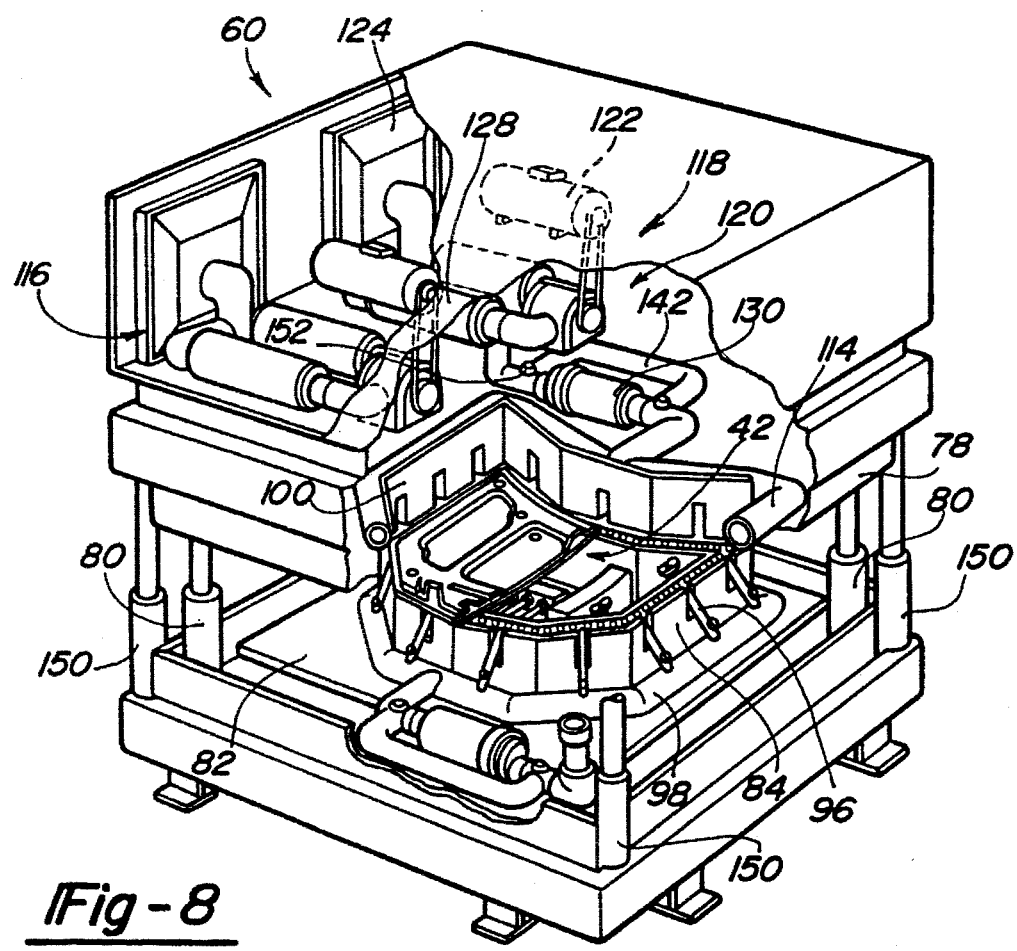
FIG. 8 is a partial cutaway perspective view of the bonding apparatus, in accordance with the present invention.

In FIG. 8, hot and cool air bonding apparatus 60 is shown in a partial cutaway perspective view and is in a closed position with the outer skin/adhesive/reinforcement member assembly 42 located therein.

Figure 7:
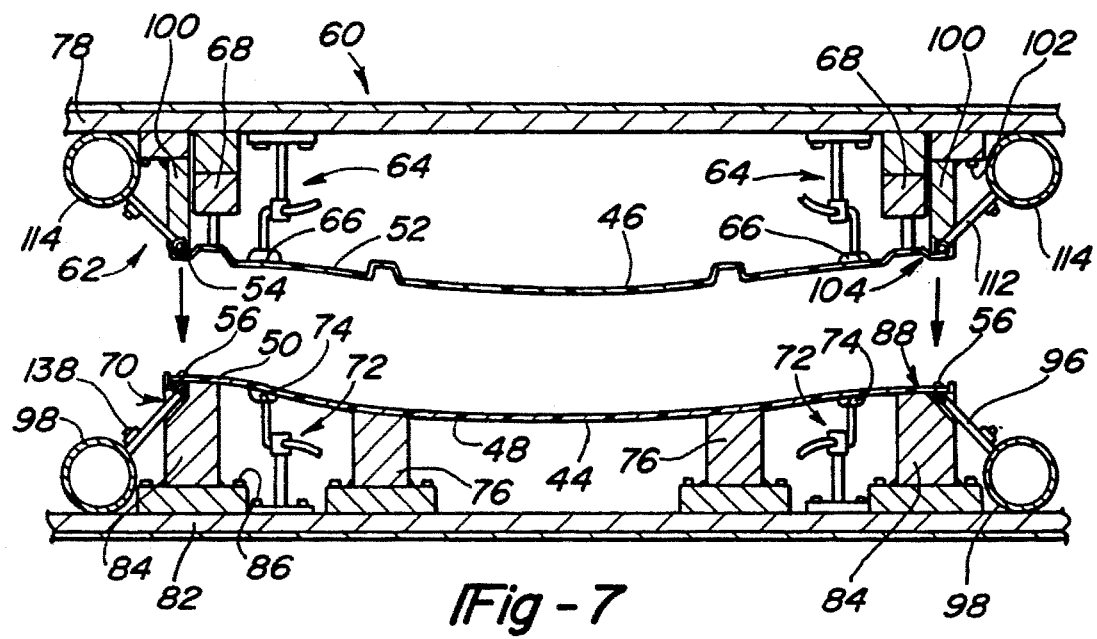
FIG. 7 is a cross-sectional view of the bonding apparatus of FIG. 8 in the open position, in accordance with the present invention.

FIG. 7 is a cross-sectional view of hot and cool air bonding apparatus 60 in an initial open position. With apparatus 60 in the open position, outer skin member 44 and reinforcement member 46 are carried into bonding apparatus 60 with reinforcement member 46 positioned within first nest member 62 and outer skin member 44 positioned within second nest member 70. As will be apparent to those skilled in the art, this can be accomplished in a variety of manners. Reinforcement member 46 is secured by vacuum assemblies 64 that include vacuum cups 66. Locators 68 ensure that reinforcement member 46 is in a proper position prior to being bonding with outer skin member 44. In a similar fashion, outer skin member 44 is secured by vacuum assemblies 72 that include vacuum cups 74. Vacuum assemblies 64 and 72 are connected to a standard vacuum source, not shown. Support members 76 support and position skin member 44 in a proper position prior to being bonding with reinforcement member 46. First nest member 62, locators 68, and vacuum assemblies 64 are all rigidly attached to base member 78 which in turn is coupled to hydraulic cylinders 80 as shown in FIG. 8. Similarly, second nest member 70, vacuum assemblies 72, and support members 76 are all rigidly secured to base member 82. Hydraulic cylinders 80 and guide posts 150, provided at the four corners of apparatus 60, control the movement of apparatus 60 between the open and closed positions. Cylinders 80 cause base member 78 to move in the direction of base member 82 until inner mating surface 54 of reinforcement member 46 contacts adhesive 56 located on inner mating surface 50 of outer skin member 44.

Figure 6:
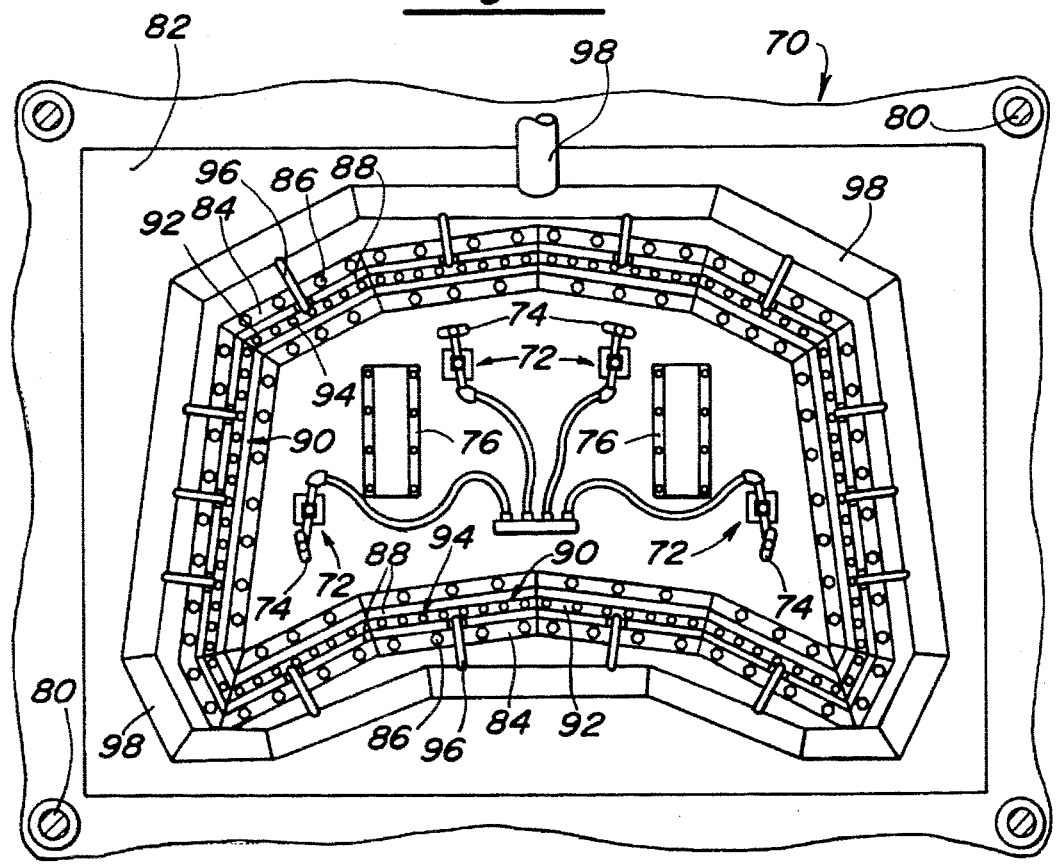
FIG. 6 is a plan view of the second nest member of the bonding apparatus with the exterior automotive body member removed, in accordance with the present invention.

As best shown in FIG. 6, which is a plan view of second nest member 70 with outer skin member 44 removed, second nest member 70 has a modular design and is formed from a series of individual block members 84. Each of block members 84 is individually secured to base member 82 by bolts 86. Block members 84 are preferably made from aluminum but can be made from any other metal or suitable material. As is apparent, the series of block members 84 form a closed loop that substantially corresponds to the shape of the outer periphery of outer skin member 44. Block members 84 include top surfaces 88 that have contours respectively corresponding to the contours of outer surface 48 of outer skin member 44.

Figure 9:
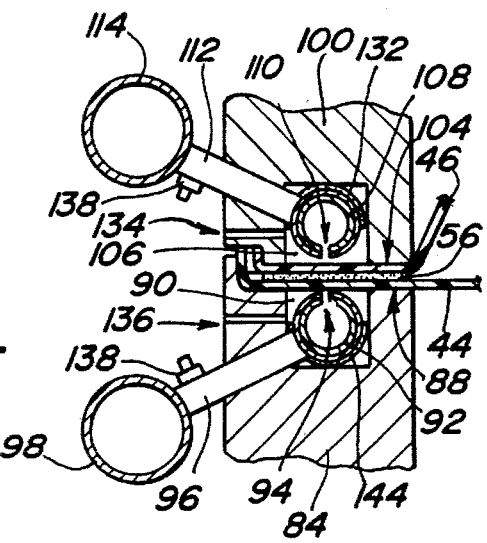
FIG. 9 is an enlarged view of a partial cross-sectional view of the bonding apparatus of FIG. 8, in accordance with the present invention.

As is best shown in FIG. 9 which is a partial cross-sectional view illustrating apparatus 60 in the closed position, slots 90 are formed within each of top surfaces 88 of block members 84. Returning to FIG. 6, when the series of block members 84 are secured to base member 82, slots 90 are aligned and form a single slot extending around the closed loop formed by block members 84. Bonding manifold 92 is positioned within slots 90 and includes apertures 94 that are formed in the direction towards outer skin member 44. Bonding manifold 92 is preferably made out of stainless steel tubing. Connector tubes 96, also preferably made out of stainless steel tubing couple bonding manifold 92 to main manifold 98 that is located on the outer periphery of second nest member 70. Main manifold 98 is also preferably formed from stainless steel tubing.

Returning to FIG. 7, first nest member 62 is also modular in design and is formed from a series of block members 100 that are individually secured to base member 78 by bolts 102. Block members 100 are also preferably made from aluminum but can be made from any other metal or suitable material. As with second nest member 70, block members 100 are positioned in series and form a closed loop that is a mirror image of the closed loop formed by second nest member 70. It should be noted that the modular designs of first and second nest members 62 and 70 allows block members 84 and 100 to be individually interchanged and/or replaced to reflect changes in the configuration of the members being bonded. As most clearly shown in FIG. 9, block members 100 include top surfaces 104 that have contours respectively corresponding to the contours of the outer surface 52 of reinforcement member 46. As with block members 84, slots 106 are formed within each of surfaces 104. When the series of block members 100 are secured to base member 78, slots 106 are aligned and form a single slot extending around the closed loop formed by block members 100. Bonding manifold 108, preferably made out of stainless steel tubing, is positioned within slots 106 and includes apertures 110 that are formed in a direction towards reinforcement member 46. Connector tubes 112, also preferably made out of stainless steel tubing, couple bonding manifold 108 to main manifold 114 that is located on the outer periphery of first nest member 62. Main manifold 114 is also preferably formed from stainless steel tubing. It should be noted that the shape and diameters of bonding manifolds 92 and 108, connector tubes 96 and 112, and main manifolds 98 and 114 are used by way of example and other shapes and diameters are within the scope of the invention. Additionally, stainless steel is used by way of example and other suitable materials are within the scope of the present invention.

As is shown in FIG. 8, bonding apparatus 60 includes two switchable heating and cooling assemblies 116 and 118. Assembly 116 provides pressurized air to main manifold 98 that in turn directs the air through connector tubes 96 to bonding manifold 92. The air is then forced through apertures 94 in the direction of outer surface 48 of outer skin member 44. In a similar fashion, assembly 118 provides pressurized air to main manifold 114 that in turn directs the air through connector tubes 112 to bonding manifold 108. The air is then forced through apertures 110 in the direction of outer surfaces 52 of reinforcement member 46. 100 and 84 of nest members 62 and 70 cooperate in a manner such that slots 106 and 90 respectively form channels above reinforcement member 46 and below outer skin member 44. The forced air that is expelled through apertures 94 and 110 enters these channels and exerts substantially equal pressure on outer surfaces 48 and 52, thereby improving bonding characteristics of the resulting assembly 42. In order to facilitate the flow of the forced air through slots 106 and 90, apertures 134 and 136, extending from within slots 106 and 90 through block members 100 and 84 to the surrounding atmosphere, allow a portion of the forced air to exit slots 106 and 90.

Figure 10:
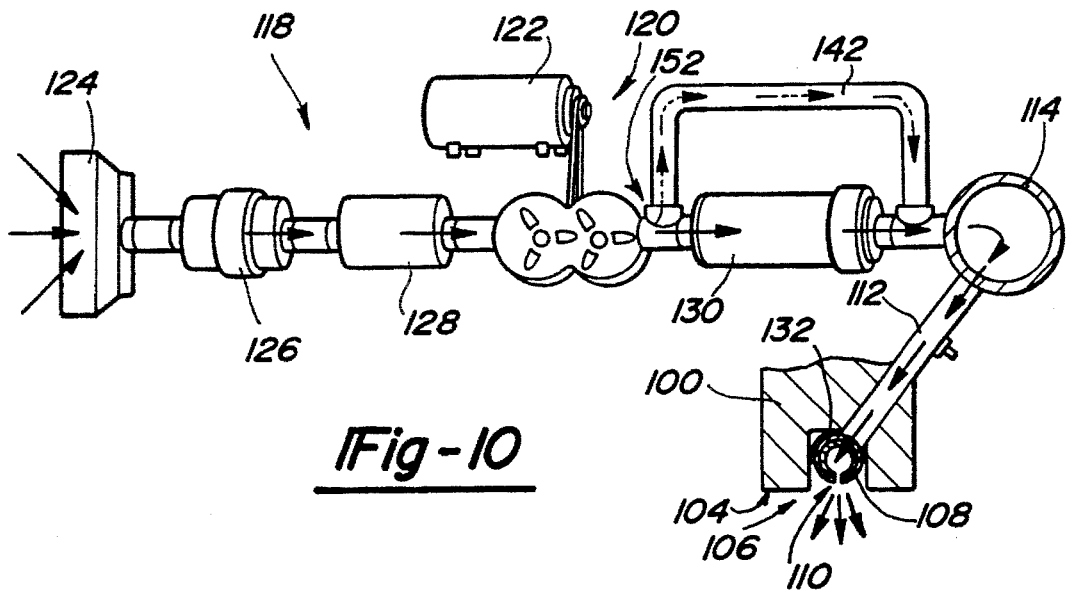
FIG. 10 is a simplified air flow diagram of the bonding apparatus of FIG. 8, in accordance with the preferred embodiment of the present invention.

FIG. 10 is an illustration of the air flow through switchable heating and cooling assembly 118. It will be apparent that the air flow through assembly 116 is accomplished in a similar fashion. It should be noted that assemblies 116 and 118 have the same features and are described below with reference to assembly 118. In accordance with the preferred embodiment, blower unit 120, which is driven by electric motor 122, draws air from the environment surrounding apparatus 60 through air filter 124, cooling unit 126, and muffler 128. During the heating phase of the bonding process, cooling unit 126 is disabled and valve 152 is set such that the blower unit 120 forces the air through heater 130. The air is quickly heated to a specified temperature and forced through main manifold 114 and connector tubes 112 to bonding manifold 108. The heated air then exits through apertures 110 into slots 106 in the direction of outer surface 52.

Insulation 132 and 144 is respectively located between bonding manifolds 108 and 92 and block members 100 and 84. Insulation 132 and 144 minimizes the transfer of heat between bonding manifold 108 and block members 100 and between bonding manifold 92 and block members 84. This reduction in the transfer of heat in turn reduces temperature changeover times for bonding manifolds 108 and 92.

After assembly 118 has provided heated pressurized air for a predetermined time period, heater 130 is disabled, cooling unit 126 is activated, and valve 152 is reversed such that an air passage to bypass duct 142 is open. Blower unit 120 draws air through activated cooling unit 126 such that the air is chilled and forces the chilled air through bypass duct 142 to main manifold 114. The chilled air is then forced through connector tubes 112 to bonding manifold 108. The chilled air then exits through apertures 110 into slots 106 in the direction of outer surface 52. The application of the chilled air to assembly 42 reduces the time required for assembly 42 to cool down. It will be apparent to one skilled in the art that assemblies 116 and 118 may be constructed without cooling unit 126, valve 15, and bypass duct 142. In such an embodiment, during the cooling phase of the bonding process, heater 130 is disabled and blower unit 120 continues to draw air through air filter 124 and muffler 128. The air is forced through heater 130 in such a manner that heater 130 is quickly cooled down. This air is then directed to main manifold 114 and eventually to bonding manifold 108. This air exiting bonding manifold 108 through apertures 110 is at a sharply reduced temperature when compared to the air that was flowing prior to heater 130 being disabled.

Figure 8A:
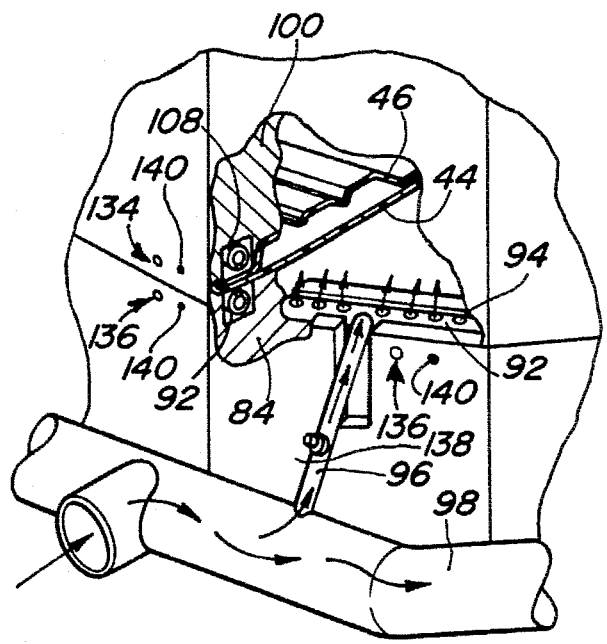
FIG. 8A is an enlargement view of a partial cutaway of the bonding apparatus of FIG. 8, in accordance with the present invention.

In order to precisely control the amount of forced air entering bonding manifolds 92 and 108, connecting tubes 96 and 112 are provided with valves 138. In addition, as shown in FIG. 8A, in order to monitor the approximate temperature of the forced air exiting bonding manifolds 92 and 108, thermocouples 140 are provided in close proximity to apertures 134 and 136 within block members 100 and 84.

In accordance with the method of bonding in accordance with the present invention, bonding apparatus 60 is initially in an open position as shown in FIG. 7. Reinforcement member 46 and outer skin member 44, with adhesive 56 on mating surface 50, are positioned within nest members 62 and 70 in a spaced relationship. Next, hydraulic cylinders 80 cause base member 78 to move in a direction towards base member 82 until mating surfaces 50 and 54 are engaged with adhesive 56 therebetween. Next, during the heating phase of the bonding process, switchable heating and cooling assembles 116 and 118 supply heated air to bonding manifolds 92 and 108 and ultimately hood assembly 42 as previously described above. This heated air is supplied at a pressure within the range of 0.5 to 8 pounds per square inch at a temperature of approximately 550° F. This heated air is supplied for approximately 15 seconds. Thereafter, assemblies 116 and 118 provide cooler temperature air, as previously described above, to bonding manifolds 92 and 108 and hood assembly 42 for approximately 45 seconds at a pressure within the range of 0.5 to 8 pounds per square inch. It will be apparent to one skilled in the art, that when the pressurized heated air is provided within slots 90 and 106, the adhesive between outer skin member 44 and 46 is heated to a temperature above its curing temperature such that outer skin member 44 and reinforcement member 46 are evenly bonded. As will be apparent to one skilled in the art, the pressure, temperature, and time period at which the hot and cool air is provided to slots 90 and 106 is used by way of example, and other operating parameters are within the scope of the present invention.

From the foregoing it can be seen that use of the hot and cool air bonding apparatus improves the surface qualities of a resulting FRP assembly and provides uniform bonding strength throughout the assembly. Further, compared to the prior art bonding techniques, the hot and cool air bonding apparatus expeditiously bonds the FRP assembly without adversely affecting surface qualities or bonding strength characteristics.

The foregoing discloses and describes merely exemplary embodiments of the present invention. One skilled in the art will readily recognize from such discussion, and from the accompanying drawings and claims, that various changes, modifications, and variations can be made therein without the departing from the spirit and scope of the present invention as defined by the following claims.

What is claimed is:

1. An apparatus for bonding a first member to a second member, said first member having a mating surface with an uncured adhesive located thereon, said apparatus comprising:

first and second nest means for receiving and supporting the first member and the second member in a spaced relationship;

moving means for controlling relative movement of the nest means such that a mating surface of the second member contacts the adhesive located on the mating surface of the first member;

switchable heating and cooling means for first blowing pressurized heated air about outer surfaces of the first member and the second member for heating the adhesive, and thereafter, blowing pressurized cooler air thereto while the members are supported in the first and second nest means;

metallic tubular members carried by and thermally insulated from at least one of the nest means and including a plurality of apertures through which the pressurized heated and cooler air is blown; and air conduit means, located on an outer periphery of at least one of the nest means, for delivering the pressurized heated and cooler air from the switchable heating and cooling means to the metallic tubular members.

2. The apparatus of claim 1, further comprising:

bypass chilling means for blowing pressurized chilled air about the outer surfaces of the first member and the second member.

3. The apparatus of claim 1, wherein the first and second nest means each include contoured surfaces respectively corresponding to contours of the outer surfaces of the first member and the second member, the contoured surfaces including first and second channels substantially extending along the length of the mating surfaces of the first member and the second member such that substantially equal air pressures are exerted against portions of the outer surfaces of the first member and the second member.

4. The apparatus of claim 3, wherein the first and second nest means each further include vacuum assemblies for respectively securing the first member and the second member to the contoured surfaces of the first and second nest means.

5. The apparatus of claim 3, wherein at least one of the nest means includes a plurality of modular sections removably secured to at least one base member.

6. The apparatus of claim 3, wherein, the metallic tubular members are substantially located within at least one of the channels.

7. The apparatus of claim 3, wherein the first and second nest means further comprise apertures extending from within the channels to external surfaces of the first and second nest means, the apertures being configured for allowing a predetermined amount of the pressurized air to escape from within the channels to the surrounding atmosphere, whereby circulation of the pressurized air about the outer surfaces of the first member and the second member is facilitated.

8. The apparatus of claim 6, wherein the switchable the heating and cooling means comprises:

at least one heater assembly coupled to the metallic tubular member for supplying the pressurized heated and cooler temperature air.

9. The apparatus of claim 1, wherein the switchable heating and cooling means further comprises:

temperature sensing means for monitoring the approximate temperature of the air supplied about the outer surfaces of the first member and the reinforcement member.

10. The apparatus of claim 1, wherein the pressurized heated and cooler temperature air is supplied at a pressure within the range of 0.5 to 8 pounds per square inch.

11. The apparatus of claim 1, wherein the pressurized heated air is supplied at a temperature of approximately 550° F.

12. The apparatus of claim 1 further comprising:

main manifold means substantially exterior to the first and second nest means for delivering the pressurized heated and cooler temperature air to the metallic tubular members.

13. The apparatus of claim 1 further comprising:

insulation material located between the metallic tubular members and the at least one nest means for minimizing the transfer of heat between the metallic tubular member and the at least one nest means.

14. The apparatus of claim 1, wherein the first member is an automotive body panel.

15. The apparatus of claim 14, wherein the second member is a reinforcement member.

16. The apparatus of claim 1, wherein the first member is a fiber reinforced plastic member.

17. An apparatus for bonding a first member to a reinforcement member, said first member having a mating surface with an uncured adhesive located thereon, said apparatus comprising:

first and second nest means for receiving and supporting the first member and the reinforcement member in a spaced relationship, the first and second nest means each include contoured surfaces respectively corresponding to contours of outer surfaces of the first member and the reinforcement member, the contoured surfaces of the first and second nest means each have first and second slots substantially extending along the length of the mating surfaces of the first member and the reinforcement member;

moving means for controlling relative movement of the nest means such that a mating surface of the reinforcement member contacts the adhesive located on the mating surface of the first member;

switchable heating and cooling means for first providing pressurized heated air about outer surfaces of the first member and the reinforcement member for heating the adhesive, and thereafter, providing cooler air thereto while the members are supported in the first and second nest means; and first and second bonding manifolds located within the slots, the first and second bonding manifolds each include a plurality of apertures for delivering the pressurized heated and cooler temperature air towards portions of the outer surfaces of the first member and the reinforcement member.

18. The apparatus of claim 17 further comprising:

main manifold means substantially exterior to the first and second nest means for delivering the pressurized heated and cooler temperature air to the first and second bonding manifolds.

19. The apparatus of claim 17 further comprising:

insulation material located between the first bonding manifold and the first nest means and between the second bonding manifold and the second nest means for minimizing the transfer of heat between the first and second bonding manifolds and the first and second nest means.

20. The apparatus of claim 17, wherein the first and second nest means further comprise apertures extending from within the slots to external surfaces of the first and second nest means, the apertures being configured for allowing a predetermined amount of the pressurized air to escape from within the slots to the surrounding atmosphere, whereby circulation of the pressurized air about the outer surfaces of the first member and the reinforcement member is facilitated.

21. The apparatus of claim 17, wherein the switchable the heating and cooling means comprises:

a first heater assembly coupled to the first bonding manifold for supplying the pressurized heated and cooler temperature air to the first bonding manifold; and a second heater assembly coupled to the second bonding manifold for supplying the pressurized heated and cooler temperature air to the second bonding manifold.

22. An apparatus for bonding a first member to a reinforcement member, said first member having a mating surface with an uncured adhesive located thereon, said apparatus comprising;

a first nest member having a contoured surface corresponding to contours of an outer surface of the reinforcement member for receiving and supporting the reinforcement member;

a second nest member having a contoured surface corresponding to contours of an outer surface of the first member for receiving and supporting the first member;

vacuum assembly means for respectively securing the first member and the reinforcement member to the contoured surfaces of first and second nest members in a spaced relationship;

moving means for moving the first nest member in a first direction towards the second nest member for bringing a mating surface of the reinforcement member into contact with the mating surface of the first member;

the contoured surfaces of the first and second nest members each include first and second slots substantially extending along the length of mating surfaces of the first member and the reinforcement member;

first and second bonding manifolds located within the slots, the first and second bonding manifolds each include a plurality of apertures; and switchable heating and cooling means for first providing pressurized heated air to the first and second bonding manifolds such that the heated air flows through the apertures towards portions of the outer surfaces of the first member and the reinforcement member for heating the adhesive, and thereafter, providing pressurized cooler air to the first and second bonding manifolds such that the cooler air flows through the apertures towards portions of the outer surfaces of the first member and the reinforcement member while the members are supported in the first and second nest means.

23. The apparatus of claim 22 further comprising:

bypass chilling means for providing pressurized chilled air about the outer surfaces of the first member and the reinforcement member.

24. An apparatus for bonding a first member to a second member, said first member having a mating surface with an uncured adhesive located thereon, said apparatus comprising:

first and second nest means for receiving and supporting the first member and the second member in a spaced relationship, at least one of the nest means including a plurality of modular sections removably secured to at least one base member;

moving means for controlling relative movement of the nest means such that a mating surface of the second member contacts the adhesive located on the mating surface of the first member;

heating and cooling means, coupled to the first and second nest means, for first heating outer surfaces of the first member and the second member for heating the adhesive and, thereafter, cooling the members while supported in the first and second nest means; and metallic tubular members carried by at least one of the nest means and including a plurality of apertures for delivering pressurized heated and cooler air towards the outer surfaces of the members.

25. The apparatus of claim 24 further comprising:

insulation material located between the metallic tubular members and the at least one nest means for minimizing the transfer of heat between the metallic tubular member and the at least one nest means.

26. The apparatus of claim 24, further comprising:

bypass chilling means for blowing pressurized chilled air about the outer surfaces of the first member and the second member.

* * * * *